United States Patent [19]

Nakamura

[11] Patent Number: 5,798,056
[45] Date of Patent: Aug. 25, 1998

[54] ALIGNING METHOD OF LIQUID CRYSTAL, PRODUCTION PROCESS OF LIQUID CRYSTAL DEVICE, AND LIQUID CRYSTAL DEVICE

[75] Inventor: Katsutoshi Nakamura, Hiratsuka, Japan

[73] Assignee: Canon Kabushiki Kaisha, Tokyo, Japan

[21] Appl. No.: 594,796

[22] Filed: Jan. 31, 1996

[30] Foreign Application Priority Data

Feb. 1, 1995 [JP] Japan ................... 7-034691

[51] Int. Cl.$^6$ .................. C09K 19/52; G02F 1/141
[52] U.S. Cl. .................. 252/299.01; 349/133; 428/1
[58] Field of Search .................. 252/299.01; 349/86, 349/89, 123, 133; 428/1

[56] References Cited

U.S. PATENT DOCUMENTS

| | | | |
|---|---|---|---|
| 4,367,924 | 1/1983 | Clark et al. | 350/334 |
| 5,262,082 | 11/1993 | Janulis et al. | 252/299.01 |
| 5,452,114 | 9/1995 | Hotta et al. | 359/75 |
| 5,543,943 | 8/1996 | Hanyu et al. | 359/43 |
| 5,568,295 | 10/1996 | Nakamura et al. | 359/75 |
| 5,686,019 | 11/1997 | Nakamura | 252/299.01 |

FOREIGN PATENT DOCUMENTS 56-107216  8/1981  Japan .

OTHER PUBLICATIONS

Schadt & Helfrich, Applied Physics Letters, v. 18 No. 4, Feb. 15, 1971, pp. 127–128.
Chandani et al. Japanese Journal of Applied Physics, V. 27 No. 5, May 1988, pp. L729–L732.
Structure and Physical Properties of Ferroelectric Liquid Crystals, Future Liquid Crystal Display and its Materials (1992), 4th Ferroelectric Liq. Crystal Intl. Conf. (1993) p. 46.

Primary Examiner—Shean C. Wu
Attorney, Agent, or Firm—Fitzpatrick, Cella, Harper & Scinto

[57] ABSTRACT

An aligning method of a chiral smectic liquid crystal showing a phase transition series of isotropic phase, smectic phase, and chiral smectic phase in this order on temperature decrease is provided. In the aligning method, the chiral smectic liquid crystal is disposed between a pair of electrode plates at least one of which is provided with an alignment control layer, preferably one having been subjected to a uniaxial aligning treatment (e.g., rubbing), and then is subjected to a treatment including a cycle of heating and cooling in temperatures ranging between a lower limit temperature showing chiral smectic phase and an upper limit temperature showing isotropic phase and smectic phase in mixture. The upper limit temperature may preferably be below an isotropic-smectic phase transition temperature by at most 3° C., particularly at most 1° C. The aligning method is effective in improving an alignment characteristic of liquid crystal molecules to provide a uniform alignment state free from an aligning defect.

22 Claims, 6 Drawing Sheets

Iso     Ch(N*)   SmA      Sm*C 5,798,056

ALIGNING METHOD OF LIQUID CRYSTAL, PRODUCTION PROCESS OF LIQUID CRYSTAL DEVICE, AND LIQUID CRYSTAL DEVICE

FIELD OF THE INVENTION AND RELATED ART

The present invention relates to an aligning method of a liquid crystal, a production process of a liquid crystal device, and a liquid crystal device, for use in computer terminal displays, flat panel displays, word processors, typewriter displays, television receives, view finders for video cameras, light valves for liquid crystal printers, etc.

As the most widely used type of displays, CRTs (cathode ray tubes) have been widely used heretofore for motion picture displays for television receivers and video tape recorders, monitor displays for personal computers, etc. Because of its drive principle, however, a CRT is accompanied with difficulties, such as lowerings in observability due to flickering, occurrence of scanning fringes caused by resolution insufficiency, etc., and deterioration of fluorescent screens due to burning. Further, electromagnetic wave issued rom a CRT has been found to exert an ill effect to human bodies, thus being liable to adversely affect the health of VDT operators. Further, a CRT structurally requires a large space behind the screen so that it obstructs the space economization at office and home.

As a device solving such difficulties of the CRT, a liquid crystal display device has been known. For example, there has been known a type of devices using a twisted nematic (TN) liquid crystal device disclosed by M. Schadt and W. Helfrich, "Applied Physics Letters" Vol. 18, No. 4 (published Feb. 15, 1971), pp. 127–128.

As one of the type of liquid crystal devices using a TN-liquid crystal, a simple matrix-type liquid crystal device is known to have an advantage in respect of production cost. This type of liquid crystal device is, however, accompanied with a difficulty that the number of pixels is limited because a larger number of high-density pixels is liable to cause crosstalk during a multiplexing drive using a matrix electrode.

In recent years, in contrast with such a simple matrix-type liquid crystal, a TFT-type liquid crystal device has been developed. In this type of liquid crystal device, each pixel is provided with and driven by a transistor (TFT), the problems of crosstalk and response speed can be solved but, on the other hand, the production of a liquid crystal device without a defective pixel becomes industrially very difficult as the display size is enlarged and incurs a large production cost, even if such a large area device is possibly produced.

For improving the above-mentioned problems of the conventional types of liquid crystal devices, a display device of the type which controls transmission of light in combination with a polarizing device by utilizing the refractive index anisotropy of ferroelectric liquid crystal molecules has been proposed by Clark and Lagerwall (Japanese Laid-Open Patent Application (JP-A) 56-107216, U.S. Pat. No. 4,367, 924). The ferroelectric liquid crystal is a chiral smectic liquid crystal generally having chiral smectic C phase (SmC*) or H phase (SmH*) in a specific temperature range and, in the chiral smectic phase, shows a property of assuming either one of a first stable state and a second stable state responding to an electrical field applied thereto and maintaining such a state in the absence of an electrical field, namely bistability, and also has a quick responsiveness to the change in electrical field. Thus, a chiral smectic ferroelectric liquid crystal device is expected to be utilized in a high speed and memory type display device and particularly to provide a large-area, high-resolution display in view of its excellent function. Recently, there has been also proposed a chiral smectic anti-ferroelectric liquid crystal device assuming three states (Chandani, Takezoe, et al; Japanese Journal of Applied Physics, Vol. 27, (1988) L.729-).

Such a chiral smectic liquid crystal device has been known to involve problems, such as occurrence of zig-zag alignment defects and a lowering in contrast due to a twist of liquid crystal molecules between a pair of substrates (called a splay (or twist) alignment) (e.g., as disclosed in a book entitled "Structure and Physical Properties of Ferroelectric Liquid Crystals" (in Japanese) authored by Atsuo Fukuda and Hideo Takezoe, published from Corona Sha K. K. (1990). These problems has been considered to arise from the presence of two types of chevron-shaped smectic layer structures of a chiral smectic liquid crystal disposed between a pair of substrates in the device.

A method of solving the problem is to provide a pretilt angle so as to uniformly direct the chevron layer structure to one direction, thereby making the splay alignment state of liquid crystal molecules between a pair of substrates unstable in terms of elastic energy compared with the uniform alignment state.

According to another method, a liquid crystal layer structure is converted from a bent chevron structure into a structure substantially close to a bookshelf layer structure wherein smectic layers are aligned with little inclination from those perpendicular to the substrates and generally in parallel with each other so as to realize the uniform alignment state free from zigzag defects and providing a high contrast (e.g., as disclosed in a book entitled "Future Liquid Crystal Display and Its Materials", edited by Atsuo Fukuda, published from K. K. C. M. C. (1992)). A method of realizing a structure close to the bookshelf layer structure is to use a naphthalene-based liquid crystal material in an appropriate amount. In this case, however, the tilt angle (a half of the angle of switching of liquid crystal molecules) is on the order of 10 degrees which is much smaller than 22.5 degrees theoretically providing a maximum transmittance and thus provides a low transmittance. Another representative method is to apply an external electric field to a liquid crystal device assuming a chevron layer structure to induce the bookshelf structure. However, the thus-induced bookshelf structure is unstable against an external stimulation, such as temperature change.

As a liquid crystal material providing a structure close to a bookshelf layer structure, there have been proposed mesomorphic compounds having a perfluoroalkyl (or perfluoroether) terminal chain (U.S. Pat. No. 5,262,082) and a liquid crystal composition (Marc Raddifee, et al; 1993 Fourth Ferroelectric Liquid Crystal International Conference, P-46). These liquid crystal materials can provide a layer structure close to a bookshelf structure having a small layer inclination angle and providing an optimum tilt angle without using an external filed such as an electric field. However, a liquid crystal material including a mesomorphic compound having a perfluoroalkyl (or perfluoroether) terminal chain does not generally assume cholesteric phase and it is difficult to finally produce a sufficiently good alignment state when used in an ordinary ferroelectric liquid crystal cell (or device).

SUMMARY OF THE INVENTION

In view of the above-mentioned circumstances, an object of the present invention is to provide a good alignment state in a liquid crystal device using a liquid crystal which does not assume cholesteric phase.

Another object of the present invention is to provide a liquid crystal device wherein a liquid crystal layer structure of a structure substantially close to a bookshelf structure is stably formed so as to provide an excellent alignment state, a high contrast, a quick response speed, a high resolution and a high brightness.

A further object of the present invention is to provide a process for producing such a liquid crystal device.

According to the present invention, there is provided an aligning method of a chiral smectic liquid crystal, comprising:

disposing a chiral smectic liquid crystal between a pair of electrode plates at least one of which is provided with an alignment control layer, the chiral smectic liquid crystal showing a phase transition series of isotropic phase, smectic phase and chiral smectic phase in this order on temperature decrease; and subjecting the chiral smectic liquid crystal to a treatment including a cycle of the steps of heating up to a first temperature at which the liquid crystal shows isotropic phase and smectic phase in mixture and cooling down to a second temperature at which the liquid crystal shows chiral smectic phase.

According to the present invention, there is provided a process for producing a liquid crystal device, comprising:

providing a cell structure comprising a pair of oppositely disposed electrode plates at least one of which is provided with an alignment control layer and a chiral smectic liquid crystal disposed between the electrode plates;

heating and injecting the chiral smectic liquid crystal into the cell structure; and subjecting the chiral smectic liquid crystal to a treatment including a cycle of the steps of heating up to a first temperature at which the liquid crystal shows isotropic phase and smectic phase in mixture and cooling down to a second temperature at which the liquid crystal shows chiral smectic phase.

According to the present invention, there is further provided a liquid crystal device, comprising:

a pair of electrode plates at least one of which is provided with an alignment control layer and a chiral smectic liquid crystal disposed between the electrode plates, wherein the chiral smectic liquid crystal is subjected to a treatment including a cycle of the steps of heating up to a first temperature at which the liquid crystal shows isotropic phase and smectic phase in mixture and cooling down to a second temperature at which the liquid crystal shows chiral smectic phase.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 6AA and 6AB are enlarged illustrations of the two types of applied voltage waveforms shown in FIG. 6A.

DETAILED DESCRIPTION OF THE INVENTION

The aligning method according to the present invention may preferably be applied to a chiral smectic liquid crystal causing alignment defects in its Sm (smectic) phase, particularly SmA (smectic A) phase, disposed between a pair of electrode plates at least one of which is provided with an alignment control layer. In a more preferred embodiment, the aligning method of the present invention is applied to a chiral smectic liquid crystal not assuming cholesteric phase on temperature decrease. The aligning method of the present invention is effective in decreasing alignment defects to provide liquid crystal molecules with a uniform alignment state based on a treatment including a cycle of heating and cooling between a specific temperature range described hereinafter.

A chiral smectic liquid crystal disposed between a pair of oppositely disposed substrates may develop ferroelectricity and bistability in its Sm* phase (chiral smectic phase, typically SmC* (chiral smectic C) phase), which is formed by gradual cooling from its liquid phase (isotropic phase). Accordingly, the alignment state in chiral smectic phase is greatly affected by a phase transition series between the isotropic phase and the chiral smectic phase. In view of the thermodynamic stability, the phase transition series may include the following four types:

(1) Iso-Ch(N*)-SmA-SmC*, (2) Iso SmA-----SmC*, (3) Iso----Ch(N*) SmC*, and (4) Iso-------SmC*, wherein Iso denotes isotropic phase; Ch(N*), cholesteric (chiral nematic) phase; and SmA, smectic A phase. The liquid crystal alignment states in the respective phases are schematically illustrated in FIGS. 1A–1D. In the case of a liquid crystal material having the phase transition series (1), a liquid crystal molecule long axis order is formed along the uniaxial aligning (rubbing) direction at Iso-Ch transition, a liquid crystal molecule positional order (layer structure) is determined at Ch-SmA transition, and a liquid crystal molecule tilt is developed at SmA-SmC* transition, so that a uniform alignment can be easily obtained because of such a sequential order determination (or formation). In contrast thereto, in the cases of liquid crystal having the phase transition series (2), (3) and (4), it becomes difficult to realize a uniform alignment because plural orders have to be determined simultaneously, i.e., simultaneous determination of molecular long axis order and layer structure for (2);

simultaneous determination of layer structure and tilting of liquid crystal molecules for (3); and simultaneous determination of molecular long-axis order, layer structure and tilting for (4). The present invention aims at realization of uniform alignment of a liquid crystal material (composition) having the phase transition series (2).

Figures 1A, 1B, 1C, 1D:
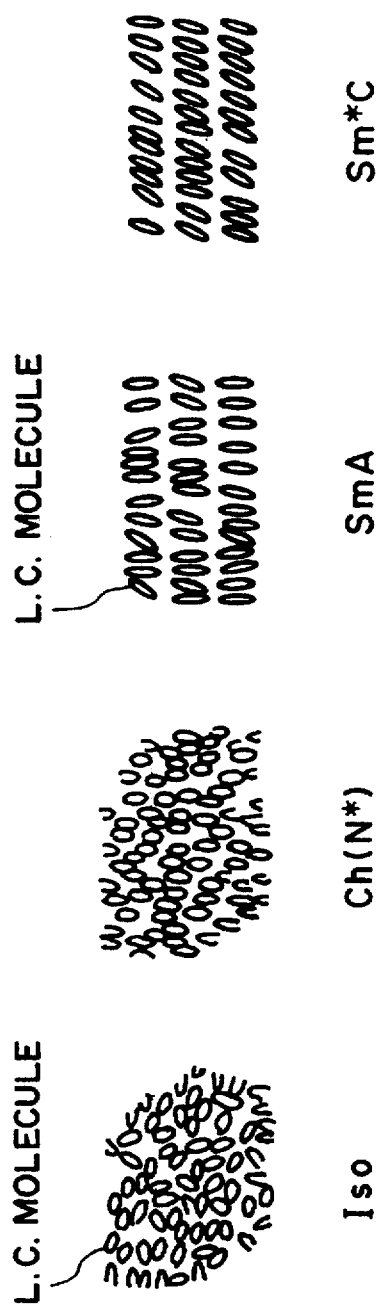
FIGS. 1A–1D are schematic illustrations of liquid crystal molecular alignment states in respective liquid crystal phases.
Figures 2A, 2B, 2C, 2D:
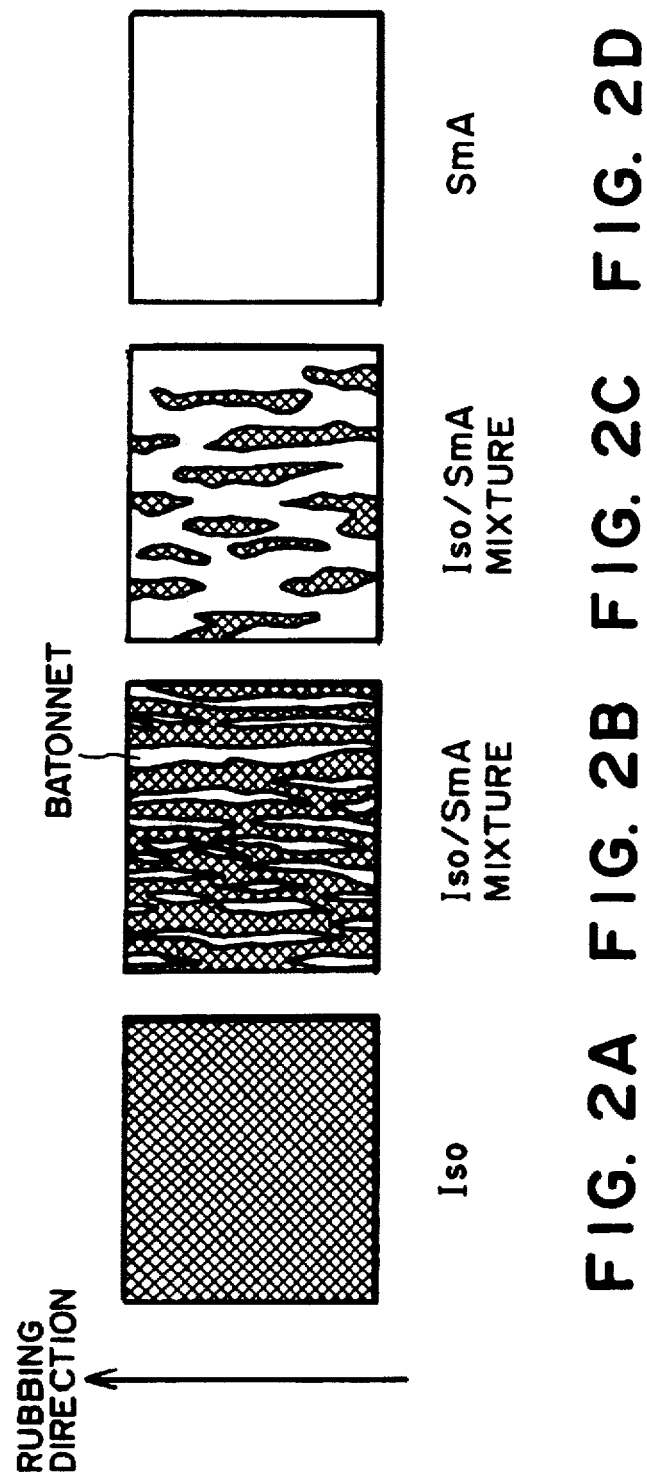
FIGS. 2A–2D are schematic illustrations of states of phase transition of Iso (isotropic) phase to SmA (smectic A) phase of a chiral smectic liquid crystal material.
Figures 3A, 3B, 3C, 3D:
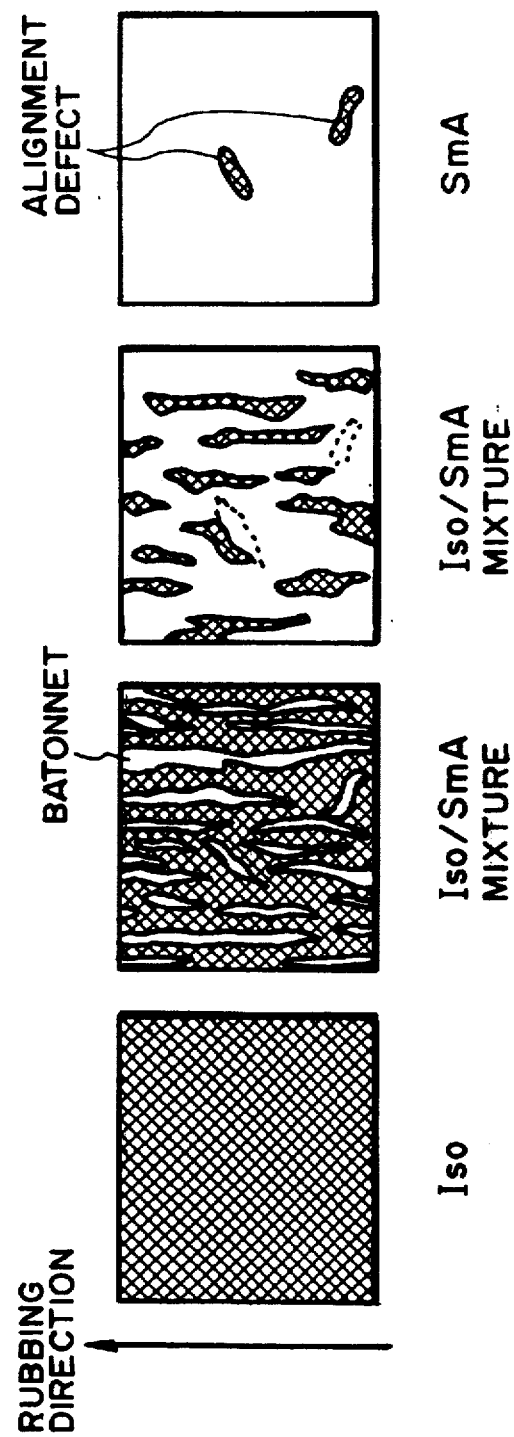
FIGS. 3A–3D are schematic illustrations for explaining an alignment defect occurring in a chiral smectic liquid crystal material placed in states of phase transition of Iso phase to SmA phase by a simple cooling step.

FIGS. 2A–2D and FIGS. 3A–3D are respectively sketches of microscopic observation by us of stages of Iso-SmA phase transition of a liquid crystal disposed between a pair of electrode plates provided with a uniaxially aligning treated-alignment control layer in a liquid crystal device. Referring to FIGS. 2A–2D (also FIGS. 3A–3D), four alignment state of liquid crystal molecules (Iso, Iso/SmA mixture (left) Iso/SmA mixture (right), and SmA) are sketched in square regions (each 100 μm square) wherein Iso phase is observed as a dark (light interruption) state through microscope observation under cross nicols (i.e., the rubbing (uniaxial aligning) direction and the polarizing axis cross at an angle of, e.g., 45 degrees) (FIGS. 2A and 3A); SmA phase is observed as a bright (light transmission) state since all liquid crystal molecules are aligned with (oriented toward) the rubbing direction (FIG. 2D); and other two states (Iso/SmA mixture (FIGS. 2B and 3B) and Iso/SmA mixture (FIG. 2C and 3C)) are respectively observed as an intermediate state wherein a dark state and a bright state are co-present in mixture. Alignment defects in SmA phase as shown in FIG. 3D are observed as regions in which a light transmittance is fluctuated or disordered.

According to our observation during the transition from isotropic (Iso) phase to smectic A (SmA) phase, islands of SmA (hereinafter called "batonnets") having an almost spheroidal shape are first generated and are joined together to complete the phase transition. Further, it is also observed that alignment defects (as shown in FIG. 3D) occur when the batonnets grow in different and random directions or due to joint failure between batonnets.

The reason for occurrence of the alignment defects has not been clarified as yet but may be attributable to an insufficiency in alignment control force for aligning liquid crystal molecules in a uniaxial aligning (or rubbing) direction at a weakly stretched portion of an alignment film (e.g., polyimide alignment film) due to a local irregularity in a degree of stretching by rubbing or an irregularity in uniaxial alignment control force (or partially weakened uniaxial alignment control force) due to unevenness of a layer under an alignment film.

Generally, liquid crystal molecule alignment is performed by simply (gradually) cooling a chiral smectic liquid crystal material from isotropic phase to chiral smectic phase. However, in the case of a chiral smectic liquid crystal material having the phase transition series (2) described above (i.e., Iso-SmA phase transition), alignment defects of liquid crystal molecules wherein the smectic layer directions do not accord or coincide as shown in FIG. 3D occur based on, e.g., the above reason. As a result, a portion having the alignment defects causes a leakage of transmitted light, thus remarkably lowering a display contrast to impair display characteristics of a resultant liquid crystal display device.

As a result of our study as to a method (or means) for aligning or orientating batonnets in one direction during occurrence and growth thereof, we have found that a treatment including at least one cycle of heating (or heating step) up to a temperature at which isotropic (Iso) phase and smectic (Sm) (e.g., smectic A (SmA)) phase are co-present in mixture as shown in FIGS. 2B, 2C, 3B and 3C (herein referred to as "Iso/Sm (or Iso/SmA) temperature") and cooling (or cooling step) down to a temperature at which only chiral smectic phase (e.g., chiral smectic C phase) is present (herein referred to as "Sm* (or SmC*) temperature") is effective in providing uniform liquid crystal molecule alignment. The cycle may preferably include a step of maintaining Iso/Sm (or Iso/SmA) temperature and/or a step of maintaining Sm* (or SmC*) temperature.

The above-mentioned liquid crystal not assuming cholesteric phase (e.g., having the phase transition series (2)) may be used as a liquid crystal material for providing a liquid crystal layer having a structure close to a bookshelf structure, so that the aligning method according to the present invention may preferably be used for providing such a liquid crystal not assuming cholesteric phase with a good alignment state.

Figure 4:
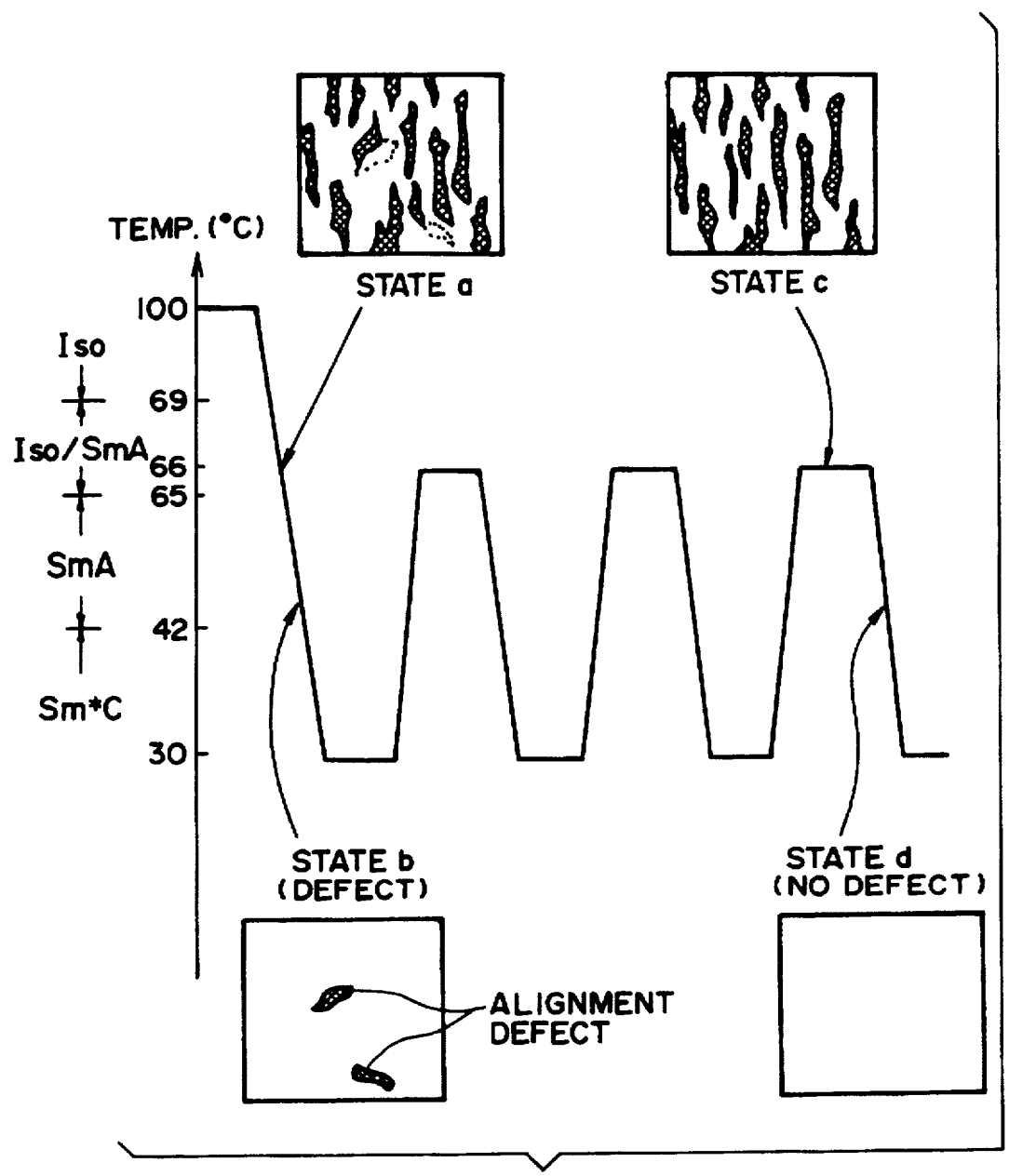
FIG. 4 includes a graph showing an embodiment of a treatment including particular heating and cooling steps according to the present invention and alignment states of liquid crystal molecules in some stages of the steps.

FIG. 4 shows an embodiment of the aligning method according to the present invention including the above-mentioned treatment which includes at least one cycle of heating and cooling between specific temperatures and including alignment states of liquid crystal molecules at some stages.

Referring to FIG. 4, when a chiral smectic liquid crystal material is heated to isotropic phase and injected into a cell structure including a pair of electrode plates and then is gradually cooled to chiral smectic C phase, a part of batonnets of liquid crystal molecules in smectic phase (e.g., smectic A phase) is not matched with surrounding batonnet portions aligned in one direction (alignment state a) and is left as it is in chiral smectic phase given by gradual cooling down to room temperature to form alignment defects (alignment state b). Thereafter, the chiral smectic liquid crystal material is subjected to a treatment including a specific cycle of heating and cooling in order to remove or decrease such alignment defects. More specifically, as shown in FIG. 4, the liquid crystal material gradually cooled to chiral smectic C phase may preferably be subjected to a treatment including at least one cycle of heating up to Iso/Sm (Iso/SmA) temperature (as upper limit temperature), keeping the Iso/Sm temperature, and cooling down to Sm* (SmC*) temperature (as lower limit temperature), and keeping the Sm* temperature, thus obtaining a uniform alignment state of liquid crystal molecules (alignment states c and d) free from alignment defects. In this instance, various parameters including the number of cycles, a heating rate (°C./min.), a cooling rate (°C./min.), a time (min.) for keeping Iso/Sm temperature, a time (min.) for keeping Sm* temperature, Iso/Sm temperature and Sm* temperature may appropriately be set depending upon a cell structure, a liquid crystal material used, an alignment control layer material used, etc. However, a better alignment state may advantageously be attained in the case of a larger number of cycles, a slower cooling rate and/or a longer keeping time of Iso/Sm temperature.

We consider that the above-described treatment including at least one cycle of heating and cooling between Iso/Sm temperature and Sm* temperature in the aligning method according to the present invention is effective in providing uniform liquid crystal molecule alignment based on the following reason.

A portion of alignment defects formed through gradual cooling has a smectic layer structure deviated in direction from the uniaxial aligning direction (e.g., rubbing direction) and also considered to be is placed in such a state that the state is not matched with the surrounding alignment state and is an energetically unstable state. Accordingly, the portion of alignment defects is transformed into isotropic phase or is matched with the surrounding (good) alignment state when the chiral smectic liquid crystal material is heated up to a temperature range wherein isotropic phase and smectic phase are co-present, i.e., at Iso/Sm temperature. When the liquid crystal material heated up to Iso/Sm temperature is again cooled down to Sm* temperature, the portion of alignment defects is transformed into and oriented to an alignment state identical to the surrounding alignment state.

More specifically, only alignment defects once occurred in smectic phase of a liquid crystal material are selectively transformed into an isotropic state. Then, the liquid crystal material is cooled to Sm* temperature, and, if necessary, is further subjected to the above-described treatment including at least one cycle of heating and cooling in order to transform the remaining isotropic state derived from the alignment defects into a surrounding good smectic phase, thus obtaining uniform alignment in smectic phase.

In this instance, according to our study, the effect of uniform alignment in smectic phase is achieved in a temperature range wherein isotropic phase and smectic phase are co-present in mixture. In a preferred embodiment of the present invention, the temperature range may be in a temperature range from below an isotropic-smectic (Iso-SmA) phase transition initiation temperature (i.e., a temperature at which a phase transition from isotropic phase to smectic phase is initiated) by at most 3° C., particularly at most 1° C., to the Iso-SmA phase transition initiation temperature. Further, in the above-described treatment of at least one cycle of heating and cooling in the aligning method of the present invention, the number of the cycle may preferably be large and a time for maintaining Iso/Sm temperature may preferably be long. Other factors including a heating rate (°C./min.), a cooling rate (°C./min.), the lower limit temperature providing Sm* phase, and a time for retaining Sm* temperature may be appropriately set in order to improve an alignment state of a chiral smectic liquid crystal used.

In the present invention, various phase transition temperatures including Iso/Sm (Iso/SmA) temperature, Sm* (SmC*) temperature, and an isotropic smectic phase transition initiation temperature are determined based on temperature values measured on temperature decrease.

Figure 5:
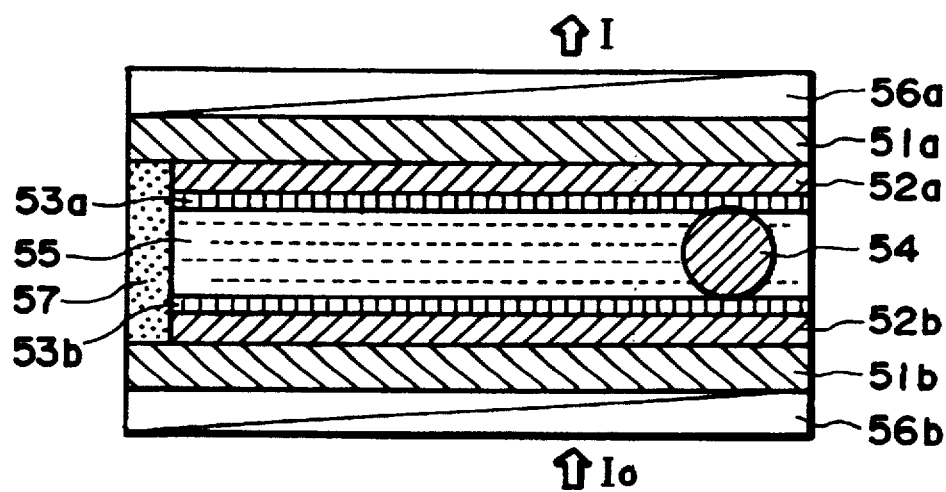
FIG. 5 is a schematic sectional view of an embodiment of the liquid crystal device (cell) using a chiral smectic liquid crystal according to the present invention.

FIG. 5 is a schematic sectional view of an embodiment of a liquid crystal device (according to the present invention) to which the aligning method and production process according to the present invention are applicable.

Referring to FIG. 5, the liquid crystal device includes a liquid crystal layer 55 comprising a chiral smectic liquid crystal material (composition) disposed between a pair of substrates 51a and 51b having thereon transparent electrodes 52a and 52b for applying a voltage to the liquid crystal layer 55 and alignment control layers 53a and 53b for controlling an alignment state of liquid crystal molecules. In the present invention, the substrates 51a and 51b and the transparent electrodes 52a and 52b may inclusively referred to as "electrode plates". The electrode plates are placed or arranged opposite to each other. The alignment control layer (53a or 53b) may be disposed on one of the transparent electrode (52a or 52b) or omitted from the cell structure. In case where at least one alignment control layer is used, either one or both of the alignment control layers may preferably be subjected to a uniaxial aligning treatment (e.g., rubbing). The periphery of the substrates 51a and 51b is sealed up with a sealing agent 57. Outside the substrates 51a and 51b, a pair of polarizers 56a and 56b are disposed so as to modulate incident light $I_0$ from a light source (not shown) disposed behind the substrate 51a or 51b, as desired, in cooperation with the liquid crystal 1 to provide modulated light I.

The liquid crystal layer 55 may preferably have a thickness (cell gap) of at most 5 μm in order to exhibit bistability (as in a model proposed by Clark and Lagerwall mentioned above). Each of two substrates 51a and 51b comprise a transparent material, such as glass or plastic and is coated with a transparent electrode 52a or 52b comprising a film of, e.g., ITO (indium-tin-oxide) to form an electrode plate. Further thereon, the alignment control layer 53a or 53b is formed by applying a solution containing a material for the alignment control layer or by vapor deposition or sputtering of a material for the alignment control layer. Examples of the material for the alignment control layer (53a or 53b) may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polyvinyl acetate, polystyrene, polysiloxane, cellulose resin, melamine resin, urea resin, acrylic resin or a polymer or copolymer having a naphthalene skeleton. The surface of thus prepared alignment control layer is subjected to uniaxial alignment treatment, e.g., by rubbing the surface with a fibrous material such as velvet, cloth or paper. The uniaxial alignment treatment (rubbing treatment) may preferably be performed to one of the alignment control films 53a and 53b. The alignment control layer may be formed by an oblique vapor deposition method wherein an oxide such as $SiO_2$ or an nitride is vapor-deposited on the electrode plate(s) from the oblique direction to the electrode plate.

The liquid crystal device of the invention may further comprise a short circuit-preventing layer for the pair of electrode plates such as an insulating layer, an inorganic material layer and an organic material layer disposed between, e.g. the transparent electrode and the alignment control layer. The pair of electrode plates are held to have a prescribed (but arbitrary) gap (e.g., 2 μm) with a gap-controlling spacer 54 of, e.g., silica beads. A voltage is applied to the liquid crystal layer 55 through the transparent electrodes 52a and 52b in accordance with a switching signal from a signal power supply not shown), thus effecting switching. As a result, the liquid crystal device functions as a light valve for a display device. Further, in case where two transparent electrodes 52a and 52b are arranged in matrix on the pair of substrates 51a and 51b it is possible to perform pattern display and pattern exposure, so that the liquid crystal device is used as a display device for a personal computer, a work station, etc., or a light valve for a printer.

The liquid crystal device of the present invention is applicable to color displays by disposing plural color filter films of, e.g., R (red), G (green), B (blue) and W (white) in a prescribed pattern on one side of the electrode plates.

In the present invention, the chiral smectic liquid crystal material may preferably be one having the phase transition series (2), i.e., not assuming cholesteric phase as described hereinabove. In this case, in order to realize a good and uniform alignment state in chiral smectic C chase by providing such a state that, in the isotropic-smectic phase transition on temperature decrease, batonnets in smectic phase are gradually generated from one electrode plate side and grown to a uniform state toward the other electrode plate side; the above-mentioned one electrode plate may preferably be provided with an alignment control layer having been subjected to the uniaxial aligning treatment and the above-mentioned the other substrate may preferably be provided with an alignment control layer which has not been subjected to the uniaxial aligning treatment.

The chiral smectic liquid crystal material (55 in FIG. 5) may preferably have ferroelectricity and may preferably be a chiral smectic liquid crystal composition comprising at least one species of a fluorine-containing mesomorphic compound The fluorine-containing mesomorphic compound contains a structure including a fluorocarbon terminal chain and a hydrocarbon terminal chain connected by a central core portion and may preferably have the above-described phase transition series (2) (Iso-SmA-SmC*) including smectic phase but not including cholesteric phase.

Herein, "mesomorphic compound" encompasses not only a compound singly assuming a mesomorphic (liquid crystal) phase but also a compound which does not assume a mesomorphic phase singly as long as a resultant liquid crystal composition containing the compound assumes a mesomorphic phase.

The fluorine-containing mesomorphic compound may preferably include those represented by the following formulae (I-1) and (I-2):

Formula (I-1)

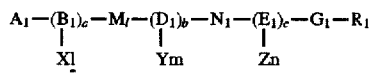

$B_1$, $D_1$ and $E_1$ independently denote

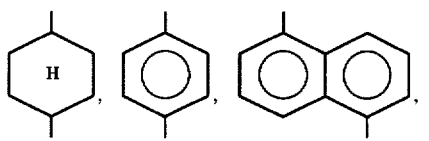

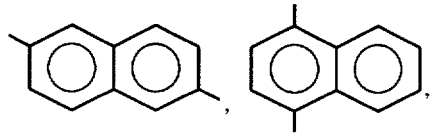

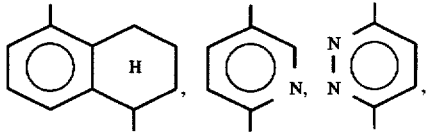

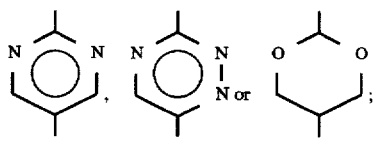

a, b and c independently denote an integer of 0–3 with the proviso that a+b+c is at least 2;

$M_1$ and $N_1$ independently denote —COO—, —OCO—, —COS—, —SCO——COSe—, —SeCO—, —COTe—, —TeCO—, —CH$_2$CH$_2$—, —CH=CH—, —C≡C—, —CH=N—, —N=CH—, —CH$_2$O— —OCH$_2$—, —CO—, —O— or a single bond;

X, Y and Z independently denote —H, —Cl, —F, —Br, —I, —OH, —OCH$_3$, —CN or —NO$_2$ and l, m and n independently denote an integer of 0–4;

$G_1$ is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —OC$_e$H$_{2e}$—OC$_e$H$_{2e}$—, —C$_e$H$_{2e}$—N(C$_p$H$_{2p+1}$)—SO$_2$—, —C$_e$H$_{2e}$—N(C$_p$H$_{2p+1}$)—CO—wherein e and e' independently denote an integer of 1–20, and p is an integer of 1–4;

$A_1$ is a linear or branched group represented by —O—C$_f$H$_{2f}$—O—C$_g$H$_{2g+1}$, —C$_f$H$_{2f}$—O—C$_g$H$_{2g+1}$, —C$_f$H$_{2f}$—R', —O—C$_f$H$_{2f}$—R', —COO—C$_f$H$_{2f}$—R', —OCO—C$_f$H$_{2f}$—R' wherein R' is —Cl, —F, —CF$_3$, —NO$_2$, —CN, —H, —COO—C$_f$H$_{2f+1}$ or —OCO—C$_f$H$_{2f+1}$ in which f, f' and g independently denote an integer of 1–20; and $R_1$ is —C$_w$F$_{2w+1}$ wherein w is an integer of 1–20; and Formula (I-2)

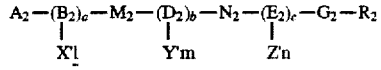

$B_2$, $D_2$ and $E_2$ independently denote

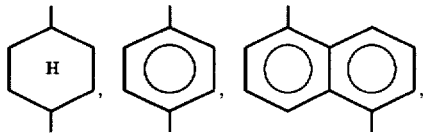

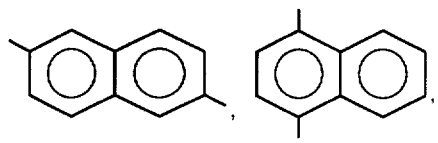

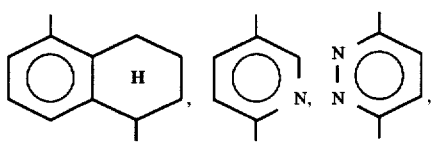

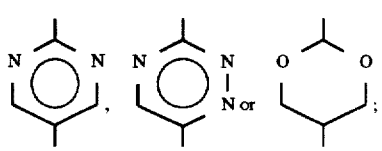

a, b and c independently denote an integer of 0–3 with the proviso that a+b+c is at least 2;

$M_2$ and $N_2$ independently denote —COO—, —OCO—, —COS—, —SCO—, —COSe—, —SeCO—, —COTe—, —TeCO—, —(CH$_2$CH$_2$)$_d$ wherein d is an integer of 1–4, —CH=CH—, —C≡C—, —CH=N—, —N=CH—, —CH$_2$O—, —OCH$_2$—, —CO—, —O— or a single bond;

X', Y' and Z' independently denote —H, —Cl, —F, —Br, —I, —OH, —OCH$_3$, —CH$_3$, —CF$_3$, —OCF$_3$—, —CN or —NO$_2$ and l, m and n independently denote an integer of 0–4;

$G_2$ is —COO—C$_e$H$_{2e}$—, —O—C$_e$H$_{2e}$—, —O(C$_e$"H$_{2e}$"O)$_t$C$_e$H$_{2e'}$—, —C$_e$H$_{2e}$—, —OSOO—, —SOO—, —SOOC$_e$H$_{2e}$—, —C$_e$H$_{2e}$—N(C$_p$H$_{2p+1}$)—SO$_2$— or —C$_e$H$_{2e}$—N(C$_p$H$_{2p+1}$)—CO—wherein e and e' independently denote an integer of 1–20, e" is an integer of 1–10 for each C$_e$"H$_{2e}$"O group, t is an integer of 1–6 and p is an integer of 0–4.

$A_2$ is a linear or branched group represented by —O—(C$_j$H$_{2j}$O)$_u$—C$_h$H$_{2h+1}$, —(C$_j$H$_{2j}$O)$_u$—C$_h$H$_{2h+1}$, —C$_j$H$_{2j}$—W, —O—C$_j$H$_{2j}$—W, —COO—C$_j$H$_{2j}$—W, or —OCO—C$_j$H$_{2j}$—W wherein W is —Cl, —F, —CF$_3$, —NO$_2$, —CN, —H, —COO—C$_h$H$_{2h+1}$ or —OCO—C$_h$H$_{2h+1}$ in which f and h independently denote an integer of 1–20 and u is an integer of 1–10; and $R_2$ is —(C$_x$F$_{2x}$-)$_{z'}$C$_y$F$_{2y+1}$ wherein x' is an integer of 1–10 for each C$_x$F$_{2x}$O group, y' is an integer of 1–10, and z' is an integer of 1–10.

The chiral smectic liquid crystal composition used in the present invention may further comprise another mesomorphic compound different from the fluorine-containing mesomorphic compound described above and an optically active compound in an appropriate proportion.

Specific examples of the fluorine-containing mesomorphic-compounds of the formulae (I-1) and (I-2) and an optically active compound may include those shown below.

These compounds may be used singly or in mixture of two or more species in an appropriate amount.

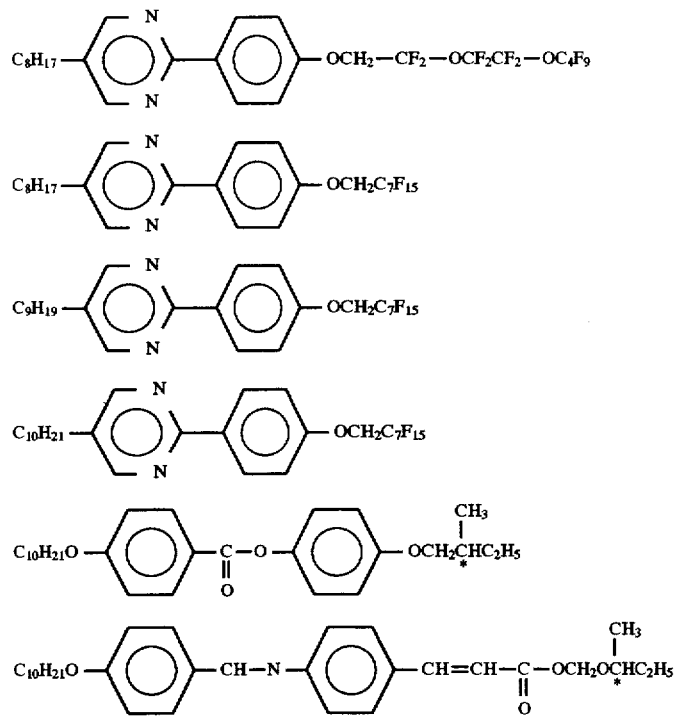

Hereinbelow, the present invention will be described based on Experimental Examples, in which the following chiral smectic liquid crystal composition was used.

Structural Formula      wt. parts

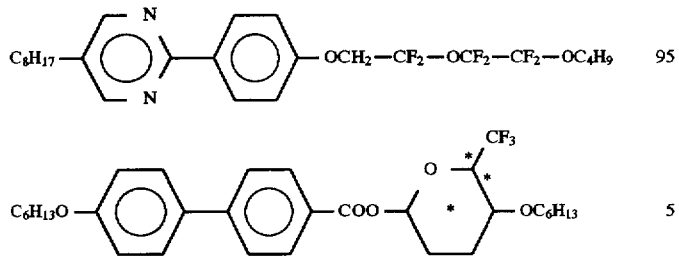

The thus prepared liquid crystal composition showed a phase transition series (°C.) and physical parameters including a tilt angle Ĥ (deg.), a spontaneous polarization Ps (nC/cm$^2$) and a layer inclination angle δ (deg.).

Phase transition temperature (°C.)

$$Iso \xrightarrow{68} SmA \xrightarrow{42} SmC* \xrightarrow{-14} Cryst$$

(cryst: crystal phase)
Ĥ=25.8 degrees (at 30° C.)
Ps=−22.6 nC/cm$^2$ (at 30° C.)
δ=approximately zero degree (at 30° C.)

In the above, the phase transition temperatures (°C.) were measured by a DSC (different scanning calorimeter) with respect to the liquid crystal composition in a bulk state.

Experimental Example 1

A liquid crystal device (cell) as shown in FIG. 5 was prepared in the following manner.

Two 1.1 mm-thick glass substrates (51a and 51b) each provided with a ca. 150 nm-thick ITO film as transparent electrodes (52a and 52b) were provided.

One substrate (51a) was further provided with a polyimide alignment control film (53a) by spin coating, i.e., by dripping a 0.4 wt. %-solution of polyamic acid ("LP-64"

(trade name), available from Toray K. K.) in a mixture solvent of NMP (N-methylpyrrolidone/nBC (n-butylcellosolve) (=2/1) onto the glass substrate rotating at 2700 rpm, followed by continuation of the rotation for 20 sec. Thereafter, the coating was pre-dried at 80° C. for 5 min and hot-baked at 270° C. for 1 hour to form a 3 nm-thick polyimide film, which was then subjected to a uniaxial aligning treatment, i.e., rubbing with a nylon cloth.

Then, the other substrate (51b) was coated with a film of silane coupling agent by spin coating. More specifically a 0.5 wt. % solution in ethanol of a silane coupling agent ("ODS-E" (trade name), available from Chisso K. K.) was dripped onto the glass substrate rotating at 2000 rpm, followed by continuation of the rotation for 20 sec. The coating was pre-dried at 80° C. for 5 min and then hot-baked at 180° C. for 1 hour.

Then, onto the glass substrate (51a) subjected to the uniaxial aligning treatment, silica beads (54) of ca. 2.0 μm in average diameter were dispersed, and the other glass substrate (51b) was superposed thereon, followed by sealing at the periphery thereof with a sealing agent (57), to form a blank cell.

Seven blank cell thus-prepared were filled under vacuum with the above-prepared liquid crystal composition (55), heated to isotropic phase, followed by gradual cooling to room temperature (30° C.) at a rate of 4° C./min, to form seven liquid crystal cells. The alignment state of liquid crystal molecules in one of the thus-prepared seven liquid crystal devices (liquid crystal cells) was observed through a microscope to evaluate a degree of alignment defect. The liquid crystal device showed a contrast of 60. Further, the liquid crystal composition showed a phase transition temperature from Iso/SmA phase in mixture to SmA phase of 65° C. (i.e., the composition showed a Iso/SmA temperature ranging from 65° C. to 69° C.) through microscope observation of the device. The results are summarized in Table 1 appearing hereinbelow.

Now, the evaluation method of alignment defect used herein will be explained.

First, a sample liquid crystal device was sandwiched between a pair of right-angle cross nicol polarizers and was rotated so that a polarizing axis (first polarizing axis) was aligned or matched with the rubbing direction to provide the darkest state over the entire display area of the device. At this time, if a region showing light leakage (or light transmission) was observed, the region was regarded as an alignment defect region (remaining in SmC* phase). Thereafter, the liquid crystal device was further rotated so that a polarizing axis (second polarizing axis) provided the darkest state to the alignment defect region. The above operation was performed in SmA phase in the cooling step (the last cooling step in the case of performing plural cycles of heating and cooling).

An angle formed between the first and second polarizing axes was evaluated as a deviation angle (an angle formed between uniformly aligned liquid crystal molecules and irregularly (or randomly) aligned liquid crystal molecules deviated from the layer normal in SmA phase of the uniformly aligned liquid crystal molecules)

A larger deviation angle corresponded to a worse alignment state providing a lower contrast.

Next the method of contrast measurement used herein will be described.

Figure 6A:
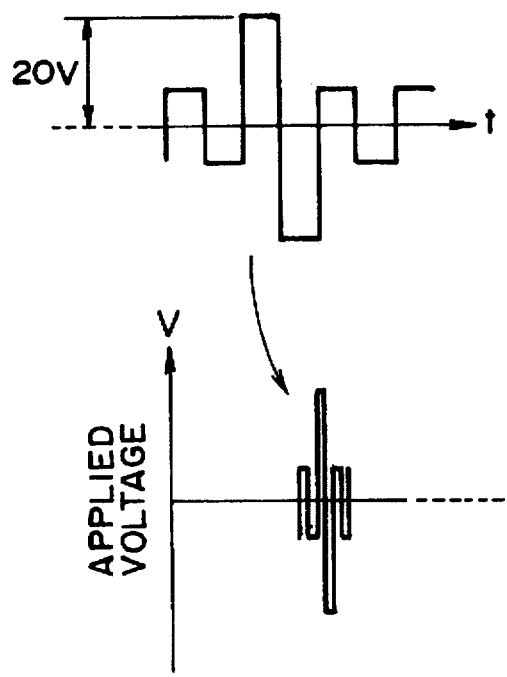
FIG. 6A is a waveform diagram showing two types of applied voltage waveform used in Experimental Examples appearing hereinafter.
Figure 6A:
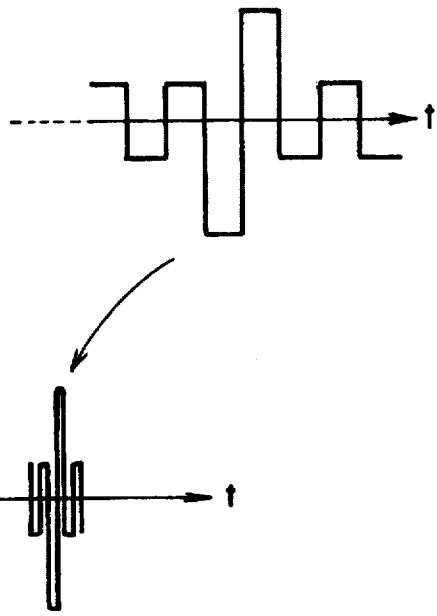
Figure 6B:
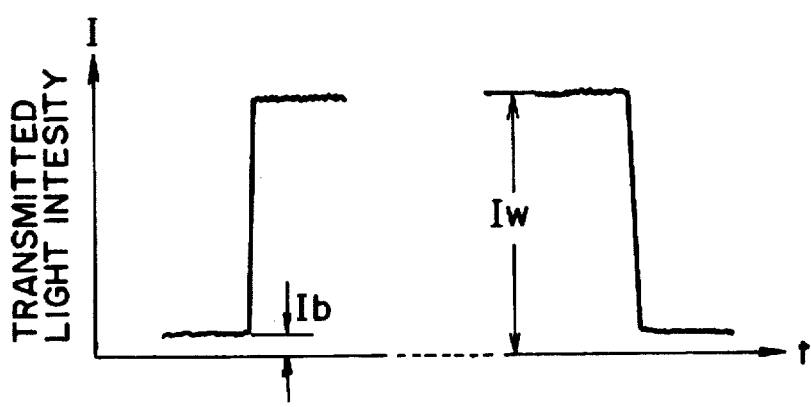
FIG. 6B is an illustration of resultant transmitted light intensities through the device.

First, a sample liquid crystal device was sandwiched between a pair of polarizers disposed in right-angle cross nicols and supplied with driving waveforms as shown in FIG. 6A (enlarged in FIGS. 6AA and 6AB) (20 V, ⅓ bias, duty factor of 1/1000). Pulse widths were adjusted to cause bistable switching. At a first switched state, the liquid crystal device was rotated so as to find the darkest position where the transmitted light intensity Ib (as shown in FIG. 6B) was measured by a photomultiplier. Then, after switching into a second state, the light intensity Iw at the brightest state (as shown in FIG. 6B) was measured. From the results, a contrast ratio (CR) as an evaluation factor was obtained as a ratio Iw/Ib. The value CR is a measure of an alignment uniformity and is decreased also in the case of alignment defects causing light leakage therethrough to provide a larger Ib value.

Experimental Examples 2–4

Three liquid crystal device among those prepared in Experimental Example 1 (except for the device used in Experimental Example 1) after left standing at room temperature (30° C.) were then subjected to a treatment including at least one cycle of heating up to 66° C. below the isotropic-smectic A phase transition temperature (69° C.) by 3° C. at a rate of 4° C./min., maintaining 66° C. for 10 min., and cooling down to room temperature (30° C.) at a rate of 4° C./min., and maintaining 30° C. for 10 min. (more specifically, one cycle for Experimental Example 2, three cycles for Experimental Example 3 (as shown in FIG. 4), and five cycles for Experimental Example 4).

The liquid crystal devices were respectively evaluated in the same manner as in Experimental Example 1.

The results are summarized in Table 1 appearing hereinafter.

Experimental Examples 5–7

Three liquid crystal device among those prepared in Experimental Example 1 (except for the devices used in Experimental Example 1–4) after left standing at room temperature (30° C.) were then subjected to a treatment including at least one cycle of heating up to 68° C. below the isotropic-smectic A phase transition temperature (69° C.) by 1° C. at a rate of 4° C./min. maintaining 68° C. for 10 min., and cooling down to room temperature (30° C.) at a rate of 4° C./min., and maintaining 30° C. for 10 min. (more specifically, one cycle for Experimental Example 5, three cycles for Experimental Example 6, and five cycles for Experimental Example 7).

The liquid crystal devices were respectively evaluated in the same manner as in Experimental Example 1.

The results are summarized in Table 1 below.

TABLE 1

| Experimental Example No. | Number of cycle | Alignment defect* | Contrast |
|---|---|---|---|
| 1 | 0 | x | 60 |
| 2 | 1 | Δ | 100 |
| 3 | 3 | o | 120 |
| 4 | 5 | o | 120 |
| 5 | 1 | o | 115 |
| 6 | 3 | o | 120 |
| 7 | 5 | o | 115 |

*: Evaluation standards for the alignment defect were as follows.
o: No region providing a deviation angle of at least 1 degree was confirmed.
Δ: A region providing a deviation angle of 1–5 degrees was confirmed.
x: A region providing a deviation angle of at least 5 degrees was confirmed.

As apparent from Table 1, the aligning method according to the present invention comprising a treatment including at least one cycle of heating and cooling between Iso/SmA temperature and SmC* temperature was found to provide a uniform alignment state even in case where a chiral smectic liquid crystal composition not assuming cholesteric phase, and particularly having a layer structure close to a bookshelf structure in which the liquid crystal composition provided a layer inclination angle δ close to 0 degrees was used.

As described hereinabove, according to the present invention, it is possible to realize a stable layer structure close to a bookshelf structure so as to provide an excellent alignment state in a chiral smectic (or ferroelectric) liquid crystal device. As a result, a large-area liquid crystal display device providing a high contrast, a quick response speed, a high resolution, and a high brightness can be realized.

What is claimed is:

1. An aligning method of a chiral smectic liquid crystal, comprising:

disposing a chiral smectic liquid crystal between a pair of electrode plates at least one of which is provided with an alignment control layer, said chiral smectic liquid crystal showing a phase transition series of isotropic phase, smectic A phase and chiral smectic phase in this order on temperature decrease; and subjecting said chiral smectic liquid crystal to a treatment including a cycle of the steps of heating up to a first temperature at which said liquid crystal shows isotropic phase and smectic A phase in mixture and cooling down to a second temperature at which said liquid crystal shows chiral smectic phase.

2. A method according to claim 1, wherein said first temperature ranges from at most 3° C. below an isotropic-smectic A phase transition initiation temperature to the phase transition initiation temperature.

3. A method according to claim 1, wherein said first temperature ranges from at most 1° C. below an isotropic-smectic A phase transition initiation temperature to the phase transition initiation temperature.

4. A method according to claim 1, wherein said pair of electrode plates are each provided with an alignment control layer, either one or both of the alignment control layers having been subjected to a uniaxial aligning treatment.

5. A method according to claim 1, wherein said pair of electrode plates at least one of which is provided with an alignment control layer includes one electrode plate provided with an alignment control layer having been subjected to a uniaxial aligning treatment.

6. A method according to claim 4, wherein said uniaxial aligning treatment comprises rubbing.

7. A method according to claim 5, wherein said uniaxial aligning treatment comprises rubbing.

8. A method according to claim 1, wherein said chiral smectic liquid crystal comprises at least one species of a compound selected from compounds represented by the formula (I-1) and (I-2) shown below:

Formula (I-1)

$$A_1-(B_1)_a-M_1-(D_1)_b-N_1-(E_1)_c-G_1-R_1$$
$$\phantom{A_1-(B_1)_a-M_1-}|\phantom{-(D_1)_b-N_1-}|\phantom{-(E_1)_c-G_1-R_1}|$$
$$\phantom{A_1-(B_1)_a-M_1}X_l\phantom{-(D_1)_b-N_1-}Y_m\phantom{-(E_1)_c-G_1-R_1}Z_n$$

$B_1$, $D_1$ and $E_1$ independently denote

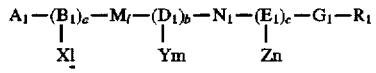

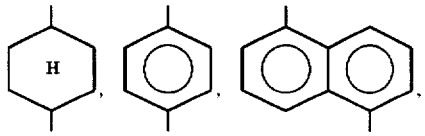

-continued

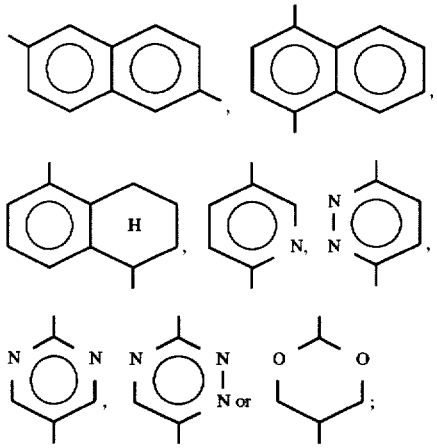

a, b and c independently denote an integer of 0-3 with the proviso that a+b+c is at least 2;

$M_1$ and $N_1$ independently denote —COO—, —OCO—, —COS—, —SCO—, —COSe—, —SeCO—, —COTe—, —TeCO—, —CH$_2$CH$_2$—, —CH=CH—, —C≡C—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CN or —NO$_2$ and l, m and n independently denote an integer of 0-4;

$G_1$ is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —OC$_e$H$_{2e}$—OC$_{e'}$H$_{2e'}$—, —C$_e$H$_{2e}$—N(C$_p$H$_{2p+1}$)—SO$_2$—, —C$_e$H$_{2e}$—N(C$_p$H$_{2p+1}$)—CO—wherein e and e' independently denote an integer of 1-20, and p is an integer of 1-4;

$A_1$ is a linear or branched group represented by —O—C$_f$H$_{2f}$—O—C$_g$H$_{2g+1}$, —C$_f$H$_{2f}$—O—C$_g$H$_{2g+1}$, —C$_f$H$_{2f}$—R', —O—C$_f$H$_{2f}$—R', —COO—C$_f$H$_{2f}$—R', —OCO—C$_f$H$_{2f}$—R' wherein R' is —Cl, —F, —CF$_3$, —NO$_2$, —CN, —H, —COO—C$_f$H$_{2f+1}$ or —OCO—C$_f$H$_{2f+1}$ in which f, f' and g independently denote an integer of 1-20; and $R_1$ is —C$_w$F$_{2w+1}$ wherein w is an integer of 1-20; and Formula (I-2)

$$A_2-(B_2)_a-M_2-(D_2)_b-N_2-(E_2)_c-G_2-R_2$$
$$\phantom{A_2-(B_2)_a-M_2-}|\phantom{-(D_2)_b-N_2-}|\phantom{-(E_2)_c-G_2-R_2}|$$
$$\phantom{A_2-(B_2)_a-M_2}X_l\phantom{-(D_2)_b-N_2-}Y_m\phantom{-(E_2)_c-G_2-R_2}Z_n$$

$B_2$, $D_2$ and $E_2$ independently denote

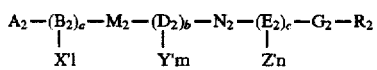

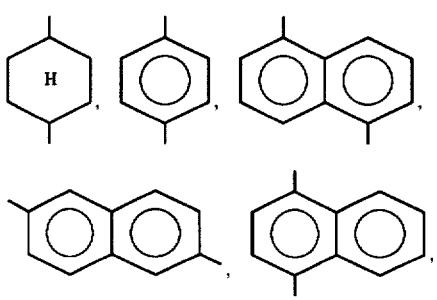

17

-continued

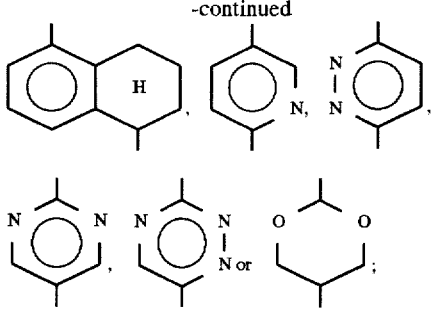

a, b and c independently denote an integer of 0–3 with the proviso that a+b+c is at least 2;

$M_2$ and $N_2$ independently denote —COO—, —OCO—, —COS—, —SCO—, —COSe—, —SeCO—, —COTe—, —TeCO—, $-(CH_2CH_2)_d$ wherein d is an integer of 1–4, —CH=CH—, —C≡C—, —CH=N—, —N=CH—, —CH$_2$O—, —OCH$_2$—, —CO—, —O— or a single bond;

X', Y' and Z' independently denote —H, —Cl, —F, —Br, —I, —OH, —OCH$_3$, —CH$_3$, —CF$_3$, —OCF$_3$—, —CN or —NO$_2$ and l, m and n independently denote an integer of 0–4;

$G_2$ is —COO—$C_eH_{2e}$—, —O—$C_eH_{2e}$—, —O—$(C_{e''}H_{2e''}O)_tC_{e'}H_{2e'}$—, —$C_eH_{2e}$—, —OSOO—, —SOO—, —SOOC$_eH_{2e}$—, —$C_eH_{2e}$—N($C_pH_{2p+1}$)—SO$_2$— or —$C_eH_{2e}$—N($C_pH_{2p+1}$)—CO— wherein e and e' independently denote an integer of 1–20, e'' is an integer of 1–10 for each $C_{e''}H_{2e''}O$ group, t is an integer of 1–6 and p is an integer of 0–4;

$A_2$ is a linear or branched group represented by —O—$(C_fH_{2f}O)_u$—$C_hH_{2h+1}$, $-(C_fH_{2f}O)_uC_hH_{2h+1}$, —$C_fH_{2f}$—W, —O—$C_fH_{2f}$—W, —COO—$C_fH_{2f}$—W, or —OCO—$C_fH_{2f}$—W wherein W is —Cl, —F, —CF$_3$, —NO$_2$, —CN, —H, —COO—$C_hH_{2h+1}$ or —OCO—$C_hH_{2h+1}$ in which f and h independently denote an integer of 1–20 and u is an integer of 1–10; and $R_2$ is $-(C_{x'}F_{2x'}O)_zC_{y'}F_{2y'+1}$ wherein x' is an integer of 1–10 for each $C_{x'}F_{2x'}O$ group, y' is an integer of 1–10, and z' is an integer of 1–10.

9. A process for producing a liquid crystal device, comprising:

providing a cell structure comprising a pair of oppositely disposed electrode plates at least one of which is provided with an alignment control layer and a chiral smectic liquid crystal disposed between the electrode plates;

heating and injecting said chiral smectic liquid crystal into the cell structure; and subjecting said chiral smectic liquid crystal to a treatment including a cycle of the steps of heating up to a first temperature at which said liquid crystal shows isotropic phase and smectic A phase in mixture and cooling down to a second temperature at which said liquid crystal shows chiral smectic phase.

10. A process according to claim 9, wherein said chiral smectic liquid crystal is heated to a temperature at which said liquid crystal shows isotropic phase and is injected into the cell structure at the temperature.

11. A process according to claim 9, wherein said first temperature ranges from at most 3° C. below an isotropic-smectic A phase transition initiation temperature to the phase transition initiation temperature.

18

12. A process according to claim 9, wherein said first temperature ranges from at most 1° C. below an isotropic-smectic A phase transition initiation temperature to the phase transition initiation temperature.

13. A process according to claim 9, wherein said pair of electrode plates are each provided with an alignment control layer, either one or both of the alignment control layers having been subjected to a uniaxial aligning treatment.

14. A process according to claim 9, wherein said pair of electrode plates at least one of which is provided with an alignment control layer includes one electrode plate provided with an alignment control layer having been subjected to a uniaxial aligning treatment.

15. A process according to claim 13, wherein said uniaxial aligning treatment comprises rubbing.

16. A process according to claim 14, wherein said uniaxial aligning treatment comprises rubbing.

17. A process according to claim 9, wherein said chiral smectic liquid crystal comprises at least one species of a compound selected from compounds represented by the formula (I-1) and (I-2) shown below:

Formula (I-1)

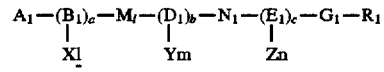

$B_1$, $D_1$ and $E_1$ independently denote

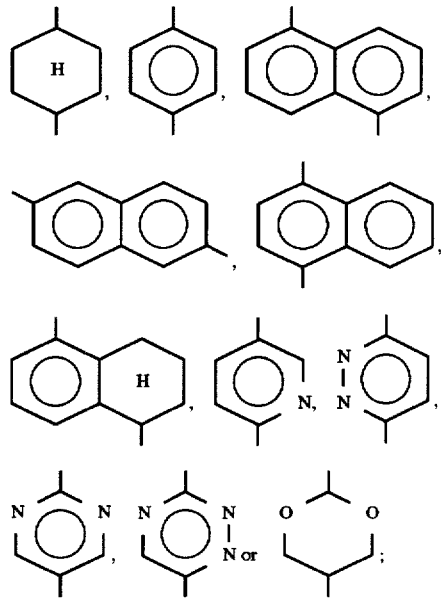

a, b and c independently denote an integer of 0–3 with the proviso that a+b+c is at least 2;

$M_1$ and $N_1$ independently denote —COO—, —OCO—, —COS—, —SCO—, —COSe—, —SeCO—, —COTe—, —TeCO—, —CH$_2$CH$_2$—, —CH=CH—, —C≡C—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CN or —NO$_2$ and l, m and n independently denote an integer of 0–4;

$G_1$ is —COO—$C_eH_{2e}$—, —O—$C_eH_{2e}$—, —$C_eH_{2e}$—, —OSOO—, —OOSO—, —SOO—, —SOOC$_eH_{2e}$—, —OC$_eH_{2e}$—OC$_{e'}H_{2e'}$—, —$C_eH_{2e}$—N($C_pH_{2p+1}$)—SO$_2$—, —$C_eH_{2e}$—N($C_pH_{2p+1}$)—CO— wherein e and e' independently denote an integer of 1–20, and p is an integer of 1–4;

$A_1$ is a linear or branched group represented by —O—$C_fH_{2f}$—O—$C_gH_{2g+1}$, —$C_fH_{2f}$—O—$C_gH_{2g+1}$, —$C_fH_{2f}$—R', —O—$C_fH_{2f}$—R', —COO—$C_fH_{2f}$—R', —OCO—$C_fH_{2f}$—R' wherein R' is —Cl, —F, —$CF_3$, —$NO_2$, —CN, —H, —COO—$C_fH_{2f+1}$ or —OCO—$C_fH_{2f+1}$ in which f, f' and g independently denote an integer of 1–20; and $R_1$ is —$C_wF_{2w+1}$ wherein w is an integer of 1–20; and Formula (I-2)

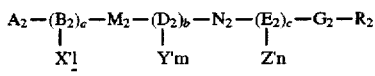

$B_2$, $D_2$ and $E_2$ independently denote

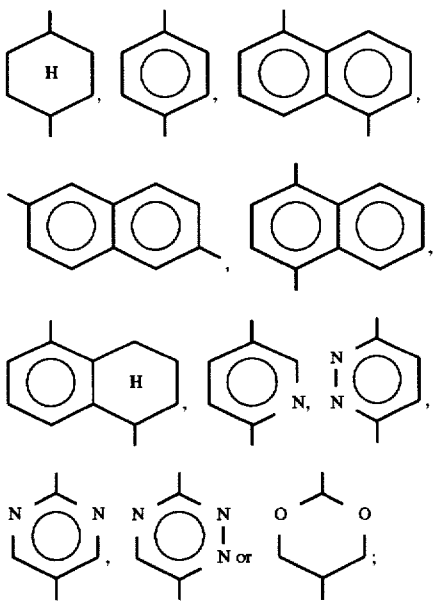

a, b and c independently denote an integer of 0–3 with the proviso that a+b+c is at least 2;

$M_2$ and $N_2$ independently denote —COO—, —OCO—, —COS—, —SCO—, —COSe—, —SeCO—, —COTe—, —TeCO—, -(CH$_2$CH$_2$)$_d$ wherein d is an integer of 1–4, —CH=CH—, —C≡C—, —CH=N—, —N=CH—, —CH$_2$O—, —OCH$_2$—, —CO—, —O— or a single bond;

X', Y' and Z' independently denote —H, —Cl, —F, —Br, —I, —OH, —OCH$_3$, —CH$_3$, —CF$_3$, —OCF$_3$—, —CN or —NO$_2$ and l, m and n independently denote an integer of 0–4;

$G_2$ is —COO—$C_eH_{2e}$—, —O—$C_eH_{2e}$—, —O($C_{e''}H_{2e''}$O)$_t$$C_eH_{2e}$—, —$C_eH_{2e}$—, —OSOO—, —SOO—, —SOOC$_eH_{2e}$—, —$C_eH_{2e}$—N($C_pH_{2p+1}$)—SO$_2$— or —$C_eH_{2e}$—N($C_pH_{2p+1}$)—CO— wherein e and e' independently denote an integer of 1–20, e'' is an integer of 1–10 for each $C_{e''}H_{2e''}$O group, t is an integer of 1–6 and p is an integer of 0–4;

$A_2$ is a linear or branched group represented by —O—($C_fH_{2f}$O)$_u$—$C_hH_{2h+1}$, -($C_fH_{2f}$O)$_u$$C_hH_{2h+1}$, —$C_fH_{2f}$—W, —O—$C_fH_{2f}$—W, —COO—$C_fH_{2f}$—W, or —OCO—$C_fH_{2f}$—W wherein W is —Cl, —F, —$CF_3$, —$NO_2$, —CN, —H, —COO—$C_hH_{2h+1}$ or —OCO—$C_hH_{2h+1}$ in which f and h independently denote an integer of 1–20 and u is an integer of 1–10; and $R_2$ is -($C_{x'}F_{2x'}$O)$_{z'}$$F_{2y'+1}$ wherein x' is an integer of 1–10 for each $C_{x'}F_{2x'}$O group, y' is an integer of 1–10, and z' is an integer of 1–10.

18. A liquid crystal device, comprising:
a pair of electrode plates at least one of which is provided with an alignment control layer and a chiral smectic liquid crystal disposed between the electrode plates, wherein
said chiral smectic liquid crystal is subjected to a treatment including a cycle of the steps of heating up to a first temperature at which said liquid crystal shows isotropic phase and smectic A phase in mixture and cooling down to a second temperature at which said liquid crystal shows chiral smectic phase.

19. A device according to claim 18, wherein said pair of electrode plates are each provided with an alignment control layer, either one or both of the alignment control layers having been subjected to a uniaxial aligning treatment.

20. A device according to claim 18, wherein said pair of electrode plates at least one of which is provided with an alignment control layer includes one electrode plate provided with an alignment control layers having been subjected to a uniaxial aligning treatment.

21. A device according to claim 19, wherein said uniaxial aligning treatment comprises rubbing.

22. A device according to claim 20, wherein said uniaxial aligning treatment comprises rubbing.

* * * * *

UNITED STATES PATENT AND TRADEMARK OFFICE
CERTIFICATE OF CORRECTION

PATENT NO. : 5,798,056

DATED : August 25, 1998

INVENTOR(S): KATSUTOSHI NAKAMURA

It is certified that error appears in the above-identified patent and that said Letters Patent is hereby corrected as shown below:

SHEET 6

Fig. 6B, "INTESITY" should hand --INTENSITY--.

COLUMN 1

Line 12, "receives" should read --receivers--;
Line 23, "rom" should read --from--; and "to" (second occurrence) should read --on--.

COLUMN 2

Line 57, "filed" should read --field--.

COLUMN 4

Line 48, "Iso----Ch(N*)SmC*," should read --Iso—Ch(N*)----SmC*,--.

COLUMN 5

Line 13, "state" should read --states--;
Line 24, "(FIG. 2C" should read --FIGS. 2C--.

UNITED STATES PATENT AND TRADEMARK OFFICE
CERTIFICATE OF CORRECTION

PATENT NO. : 5,798,056

DATED : August 25, 1998

INVENTOR(S): KATSUTOSHI NAKAMURA

It is certified that error appears in the above-identified patent and that said Letters Patent is hereby corrected as shown below:

COLUMN 6

Line 62, "is placed in such a state that the" should read --placed in an energetically unstable state that--;
Line 63, "state" (first occurrence) should be deleted;
Line 64, "and is an energetically unstable state" should be deleted.

COLUMN 7

Line 38, "isotropic smectic" should read --isotropic-smectic--;
Line 51, "state-of" should read --state of--;
Line 53, "referred" should read --be referred--.

COLUMN 8

Line 29, "an" should read --a--;
Line 41, "not" should read --(not--;
Line 57, "C chase" should read --C phase--.

COLUMN 9

Line 4, "compound The" should read --compound. The--;
Line 62, "$-OC_eH_{2e}-OC_e,H_{2e}-,$" should read --$-OC_eH_{2e}-OC_{e'}H_{2e'}-,$--.

UNITED STATES PATENT AND TRADEMARK OFFICE
CERTIFICATE OF CORRECTION

PATENT NO. : 5,798,056

DATED : August 25, 1998

INVENTOR(S): KATSUTOSHI NAKAMURA

It is certified that error appears in the above-identified patent and that said Letters Patent is hereby corrected as shown below:

COLUMN 10

Line 2, "—$CF_3$—" should read -- —$CF_3$, --;
Line 3, "$NO_2$," should read -- —$NO_2$, --;
Line 50, "—O($C_{e''}H_{2e''}$O)$_t C_{e'}H_{2e'}$—," should read
  -- —O($C_{e''}H_{2e''}$O)$_t C_{e'}H_{2e'}$—, --;
Line 51, "—SOO—SOO$C_e H_{2e}$—," should read -- —SOO—, —SOO$C_e H_{2e}$—, --;
Line 54, "$C_{e''}H_{2e''}$O should read --$C_{e''}H_{2e''}$O--;
Line 63, "is $(C_{x'}F_{2x'})_{z'} C_{y'}F_{2y'+1}$" should read
  --is $(C_{x'}F_{2x'}O)_{z'} C_{y'}F_{2y'+1}$"--.

COLUMN 11

Line 5, "mesomorphic-compounds" should read --mesomorphic compounds--;
Line 65, "angle Ĥ" should read --angle (H)--.

COLUMN 12

Line 7, Ĥ=25.8" should read --(H)=25.8--;
Line 41, "(different" should read --(differential--.

COLUMN 13

Line 10, "specifically" should read --specifically,--;
Line 23, "cell" should read --cells--;
Line 62, "Next" should read --Next,--.

UNITED STATES PATENT AND TRADEMARK OFFICE
CERTIFICATE OF CORRECTION

PATENT NO. : 5,798,056

DATED : August 25, 1998

INVENTOR(S): KATSUTOSHI NAKAMURA

It is certified that error appears in the above-identified patent and that said Letters Patent is hereby corrected as shown below:

COLUMN 14

Line 14, "device" should read --devices--;
Line 31, "device" should read --devices--.

COLUMN 15

Line 53, "formula (I-1) should read --formulae (I-1)--.

COLUMN 18

Line 20, "formula (I-1) should read --formulae (I-1)--.

COLUMN 20

Line 40, "layers" should read --layer--.

Signed and Sealed this

Sixth Day of April, 1999

Attest:

Q. TODD DICKINSON

*Attesting Officer*     *Acting Commissioner of Patents and Trademarks*